US 7,006,518 B2

(12) United States Patent
Ornes et al.

(10) Patent No.: US 7,006,518 B2
(45) Date of Patent: Feb. 28, 2006

(54) METHOD AND APPARATUS FOR SCHEDULING STATIC AND DYNAMIC TRAFFIC THROUGH A SWITCH FABRIC

(75) Inventors: Matthew D. Ornes, Madison, WI (US); Gene K. Chui, Campbell, CA (US); Chris Norrie, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 937 days.

(21) Appl. No.: 09/865,258

(22) Filed: May 25, 2001

(65) Prior Publication Data

US 2002/0176428 A1    Nov. 28, 2002

(51) Int. Cl.
*H04L 12/43* (2006.01)
(52) U.S. Cl. .................... 370/458; 370/468
(58) Field of Classification Search ........... 370/411, 370/458, 352, 353, 354, 355, 356, 493, 257, 370/389, 412, 419, 398; 709/102
See application file for complete search history.

(56) References Cited

U.S. PATENT DOCUMENTS

| | | | | |
|---|---|---|---|---|
| 5,864,542 A | * | 1/1999 | Gupta et al. | 370/257 |
| 5,987,031 A | * | 11/1999 | Miller et al. | 370/412 |
| 6,160,651 A | * | 12/2000 | Chang et al. | 398/79 |
| 6,259,699 B1 | * | 7/2001 | Opalka et al. | 370/398 |
| 6,370,149 B1 | * | 4/2002 | Gorman et al. | 370/419 |
| 6,580,721 B1 | * | 6/2003 | Beshai | 370/428 |
| 6,628,617 B1 | * | 9/2003 | Karol et al. | 370/237 |
| 6,714,536 B1 | * | 3/2004 | Dowling | 370/356 |
| 6,807,167 B1 | * | 10/2004 | Chakrabarti et al. | 370/352 |
| 6,819,666 B1 | * | 11/2004 | Chang et al. | 370/352 |
| 2002/0110115 A1 | * | 8/2002 | Gorman et al. | 370/352 |
| 2002/0176402 A1 | * | 11/2002 | Karim | 370/352 |
| 2004/0174876 A1 | * | 9/2004 | Peirce et al. | 370/389 |

* cited by examiner

*Primary Examiner*—Bob A. Phunkulh

(74) *Attorney, Agent, or Firm*—Victor H. Okumoto

(57) ABSTRACT

A method and apparatus for scheduling static and dynamic traffic through a switch fabric are described. The method comprises for each switch slice in a distributed switch fabric, scheduling static traffic by reserving time slots for transmission of the static traffic to at least one destination, and scheduling dynamic traffic so as not to be transmitting the dynamic traffic to the at least one destination during the reserved time slots. The apparatus implements the method and comprises a memory storing a schedule of static traffic, shifters storing dynamic traffic scheduling requests, and a grant scheduler.

62 Claims, 8 Drawing Sheets

| WORD ADDRESS | TDM SCHEDULE ENTRY |
|---|---|
| 0 | TS0, SOURCE 0 |
| 1 | TS0, SOURCE 1 |
| ... | ... |
| 63 | TS0, SOURCE 63 |
| 64 | TS1, SOURCE 0 |
| 65 | TS1, SOURCE 1 |
| ... | ... |
| 127 | TS1, SOURCE 63 |
| 128 | TS2, SOURCE 0 |
| ... | ... |
| 767 | TS11, SOURCE 63 |

FIG.7

| VALID | RESERVED | DESTINATION PORT1 | DESTINATION PORT2 | CHANNEL NUMBER |

FIG.8

METHOD AND APPARATUS FOR SCHEDULING STATIC AND DYNAMIC TRAFFIC THROUGH A SWITCH FABRIC

FIELD OF THE INVENTION

The present invention generally relates to SONET/SDH network elements and in particular, to a method and apparatus for scheduling static and dynamic traffic through a switch fabric of a SONET/SDH network element.

BACKGROUND OF THE INVENTION

In a synchronous optical network ("SONET") or synchronous digital hierarchy ("SDH") network element ("NE"), traffic flows from ingress line cards ("sources") to egress line cards ("destinations") across a switch fabric. Switch fabrics generally fall into one of two categories. The first category is circuit switching. For circuit switching, a fixed or static connection or path is established for the duration of the transmission. For such static connection traffic ("static traffic"), the basic switching element is typically in terms of bytes of data. The second category is dynamic switching. For dynamic switching, the connection or path is created dynamically. For such dynamic connection traffic ("dynamic traffic"), the basic switching element is usually in terms of packets of data that typically may take different routes to get to their destination.

The architectures of circuit switching and dynamic switching usually lend themselves to different applications. Therefore, their implementations are usually very different. In certain applications, however, it is desirable to accommodate both types of traffic through the switch fabric of a SONET/SDH NE.

OBJECTS AND SUMMARY OF THE INVENTION

Accordingly, it is an object of the present invention to provide a method for scheduling static and dynamic traffic through a switch fabric.

Another object is to provide an apparatus for scheduling static and dynamic traffic through a switch fabric.

Still other objects are to provide methods and apparatuses for scheduling traffic flexibly and efficiently through a switch fabric.

These and additional objects are accomplished by the various aspects of the present invention, wherein briefly stated, one aspect of the invention is method for scheduling static and dynamic traffic through a switch fabric including one or more switch slices, comprising for individual such switch slices: scheduling static traffic by reserving time slots for transmitting the static traffic to at least one destination through a switch slice; and scheduling dynamic traffic so as not to be transmitting the dynamic traffic to the at least one destination during the reserved time slots through the switch slice, wherein the scheduling dynamic traffic includes receiving dynamic traffic scheduling requests, aging previously received and not granted dynamic traffic scheduling requests, and discarding expired dynamic traffic scheduling requests to define active dynamic traffic scheduling requests.

Another aspect is an apparatus for scheduling static and dynamic traffic through a switch fabric including one or more switch slices. Included in individual ones of such switch slices are buffers for storing requests for transmission of dynamic traffic to dynamic traffic destinations through the switch slice, wherein the buffers include request shifters that receive dynamic traffic scheduling requests, age previously received and not granted dynamic traffic scheduling requests by shifting them upon each clock pulse controlling transfer of cells to and from the switch slice, and discard expired dynamic traffic scheduling requests by shifting them out of the request shifters; a memory storing a schedule of static traffic to be transmitted to at least one static traffic destination through the switch slice; and a grant scheduler coupled to the buffers and the memory for reserving time slots for transmitting the static traffic to the at least one static traffic destination, and scheduling selected ones of the requests for transmission of dynamic traffic so as not to be transmitting any of the dynamic traffic to the at least one static traffic destination during the reserved time slots through the switch slice.

Another aspect is a method for scheduling dynamic traffic through a switch fabric including one or more switch slices, comprising for individual such switch slices: (a) receiving a plurality of dynamic traffic scheduling requests individually having an associated priority, source, and destination; (b) incrementing ages of previously received and ungranted dynamic traffic scheduling requests individually having an associated priority, source, and destination; (c) generating relative weights for the plurality of dynamic traffic scheduling requests and the previously received and ungranted dynamic traffic scheduling requests based upon their associated priorities and ages; and (d) determining a set of dynamic traffic scheduling requests to be granted from the plurality of dynamic traffic scheduling requests and the previously received and ungranted dynamic traffic scheduling requests using their relative weights such that no two dynamic traffic scheduling requests in the set has the same associated source or destination.

Another aspect is an apparatus for scheduling dynamic traffic through a switch fabric including one or more switch slices. Included in individual ones of such switch slices are buffers storing requests for transmission of dynamic traffic through a switch slice, each of the requests having an associated priority, source, destination, and age; and a grant scheduler coupled to the buffers for determining a set of requests to be granted by generating relative weights for the requests based upon their associated priorities and ages, and determining a set of requests to be granted using said relative weights such that no two requests in the set has the same associated source or destination.

In yet another aspect, a SONET/SDH network element comprises: a plurality of line cards; and a plurality of switch slices individually coupled to each of the plurality of line cards, and individually including means for scheduling static traffic from one of the plurality of line cards to another or the same one of the plurality of line cards by reserving time slots for transmitting the static traffic through the individual switch slice, and means for scheduling dynamic traffic so as not to be transmitting the dynamic traffic to the another or the same one of the plurality of line cards during the reserved time slots through the individual switch slice, wherein the scheduling dynamic traffic includes receiving dynamic traffic scheduling requests, aging previously received and not granted dynamic traffic scheduling requests, and discarding expired dynamic traffic scheduling requests to define active dynamic traffic scheduling requests.

Additional objects, features and advantages of the various aspects of the present invention will become apparent from the following description of its preferred embodiment, which description should be taken in conjunction with the accompanying drawings.

BRIEF DESCRIPTION OF THE DRAWINGS

FIG. 7 illustrates, as an example, a static switch calendar stored in a static scheduler RAM, utilizing aspects of the present invention.

FIG. 8 illustrates, as an example, a TDM schedule entry in the static switch calendar, utilizing aspects of the present invention.

DETAILED DESCRIPTION OF THE PREFERRED EMBODIMENT

The following description and claimed invention are applicable to both synchronous optical network (SONET) and synchronous digital hierarchy (SDH) network elements and components. Accordingly, to simplify the following description and claims, it is to be understood that the term SONET, as used herein, shall be interpreted as including both SONET and SDH.

Figure 1:
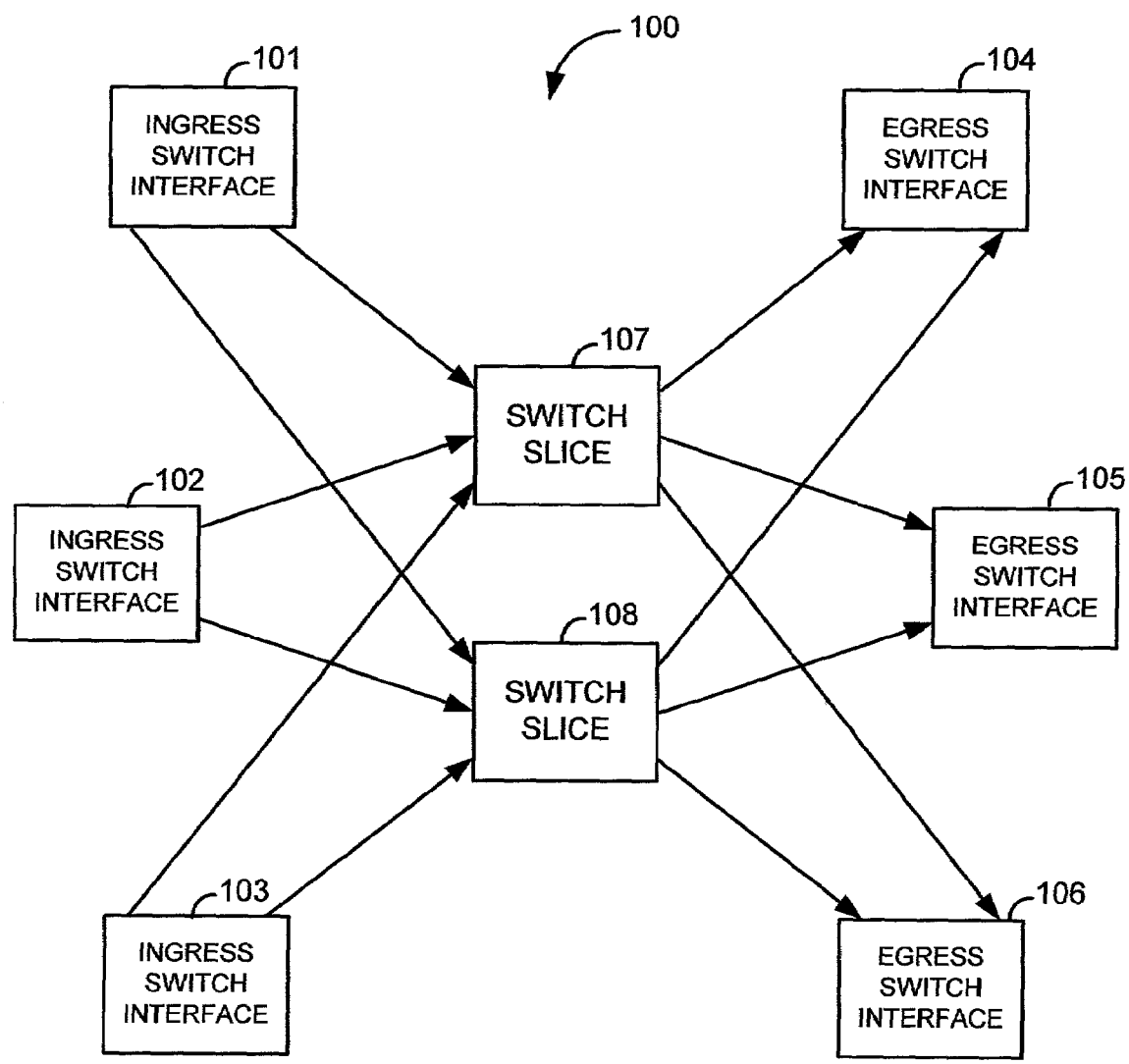
FIG. 1 illustrates a block diagram of portions of a SONET network element, utilizing aspects of the present invention.

FIG. 1 illustrates a block diagram of portions of a SONET NE 100, including switch interfaces 101~106 and switch slices 107~108. Switch interfaces 101~103 are denoted as ingress switch interfaces, because data is entering the SONET NE 100 through them. Switch interfaces 104~106, on the other hand, are denoted as egress switch interfaces, because data is exiting the SONET NE 100 through them. Switch slices 107~108 form a distributed switch fabric that routes traffic from the ingress switch interfaces 101~103 to the egress switch interfaces 104~106. Line cards in the SONET NE 100 typically have both ingress and egress switch interfaces.

Preferably, the switch interfaces 101~106 and the switch slices 107~108 are coupled together such that each of the switch interfaces 101~106 is coupled to each of the switch slices 107~108 by coupling respectively corresponding transmitting and receiving ports. For example, in FIG. 1, a transmitting port of ingress switch interface 101 is coupled to a receiving port of switch slice 107 as depicted by the solid-line arrow between the two, and a receiving port of egress switch interface 104 is coupled to a transmitting port of switch slice 107 as depicted by the solid-line arrow between the two, where in this case, the solid-lines indicate the direction of information flow.

Some of the line cards in a SONET NE are dedicated to handling static traffic such as time-division multiplexing ("TDM") traffic. Other line cards are dedicated to handling dynamic traffic such as asynchronous traffic mode ("ATM") or Internet protocol ("IP") traffic. Still other line cards have the flexibility to handle a mix of static and dynamic traffic.

Regardless of the type of traffic, a cell is the basic switching element within the switch fabric. Each cell has three sections that are generally independent from one another. These sections are the control and status section, the request/grant section and the payload data unit ("PDU") section. By embedding all three of these sections in a cell, the number of physical connections between the switch interfaces 101~106 and switch slices 107~108 is minimized, the percentage of the serial line overhead is decreased, and the logic that creates and processes information is simplified. In operation, cells are continually sent back and forth between the switch interfaces 101~106 and switch slices 107~108, one after another, once they are in operation, even if one or more of the sections are not valid.

Each line card handling dynamic traffic must first send one or more dynamic traffic scheduling requests to a switch slice, and receive a grant back from the switch slice before it can transmit its dynamic traffic payload in a cell to the switch slice. Requests are embedded in the request/grant sections of cells traveling from a requesting line card's ingress switch interface to a switch slice, such as represented by the solid-line arrow going from the ingress switch interface 101 to the switch slice 107. Grants, on the other hand, are embedded in the request/grant sections of cells traveling from a switch slice back to the requesting line card's egress switch interface, such as, for example, represented by the solid-line arrow going from the switch slice 107 to the egress switch interface 104, which is assumed in this case to be on the same line card as and in communication with the ingress switch interface 101. Sometimes, a request may not be granted, because of scheduling considerations such as higher priorities of other competing requests. In such cases, no grant is received back, and after a period of time, the original request may be resubmitted.

There are two basic types of dynamic traffic scheduling requests. In a unicast request, the requesting or source line card's ingress switch interface seeks to transmit its dynamic traffic payload to a specified destination line card's egress switch interface. In one example of this mode, the requesting line card can make a primary request to send a payload to a primary destination as well as a secondary request to send a payload to a secondary destination in the same dynamic traffic scheduling request to a switch fabric. In a multicast request, the requesting line card's ingress switch interface seeks to transmit its information to multiple specified destination line cards'egress switch interfaces. In either type of request, a line card's traffic manager cooperating with the line card's ingress switch interface generally determines the destination to be requested and assigns priorities to the requests. A dynamic traffic scheduling request as referred to herein may include one or more unicast requests, one or more multicast requests, or a combination of unicast and multicast requests.

Figure 2:
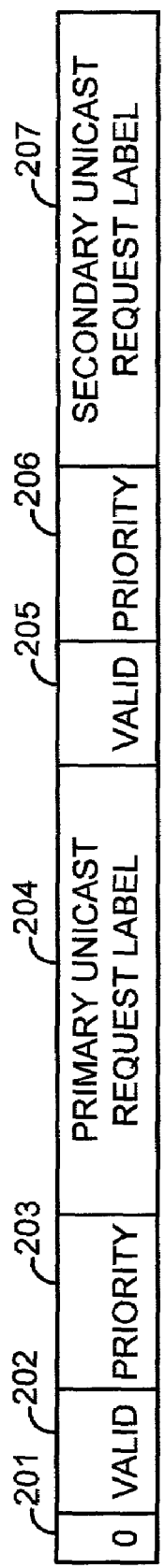
FIG. 2 illustrates an example of a unicast request format for dynamic traffic.

FIG. 2 illustrates an example of a unicast request format as embedded in the request/grant section of a cell. A first field 201 indicates whether the request is a unicast or multicast request. In this case, a "0" indicates that the request is a unicast request. In the same unicast request, a primary request is on the left side and a secondary request is on the right side. Both requests include a request valid field (202 and 205, respectively) containing an indication of whether or not the request is valid. Both primary and secondary requests also have a request priority field (203 and 206, respectively) and a request label (204 and 207, respectively). The request priority field contains the priority for the request as assigned by the traffic manager on the requesting line card. The request label field contains the number of the unicast queue in the requesting line card's ingress switch interface that stores the dynamic traffic to be transmitted. Since the queue structure in the requesting line card is organized in this implementation so that a separate unicast queue is assigned to each destination line card, the unicast queue number in this case also indicates the destination of the dynamic traffic being transmitted.

Figure 3:
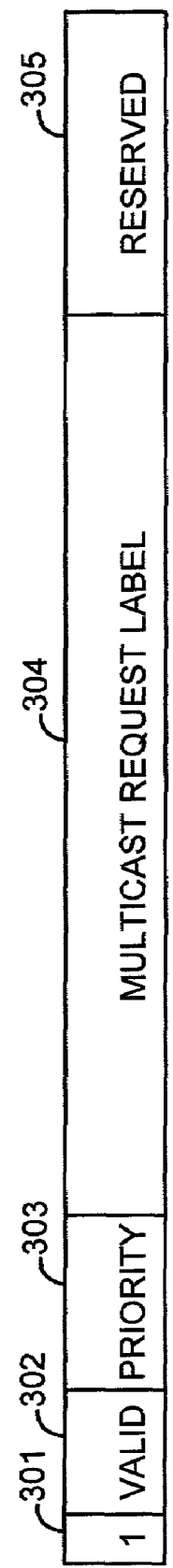
FIG. 3 illustrates an example of a multicast request format for dynamic traffic.

FIG. 3 illustrates an example of a multicast request format. A first field 301 indicates whether the request is a unicast or multicast request. In this case, a "1" indicates that the request is a multicast request. A request valid field 302 contains an indication of whether or not the request is valid. A request priority field 303 contains the priority for the multicast request as assigned by the traffic manager on the requesting line card. A request label field 304 contains a coded number that indicates the destinations for that dynamic traffic. Field 305 is reserved for future use.

Each line card handling static traffic, on the other hand, transmits its static traffic payload through its ingress switch interface to a switch slice upon receiving a grant to do so from the switch slice. The requesting or source line card's ingress switch interface in this case, does not have to send a scheduling request to the switch slice. As in the dynamic traffic case, grants are embedded in cells traveling from the switch slice to the requesting line card's egress switch interface that communicates the grants back to the line card's ingress switch interface.

Although the simplified SONET NE 100 is useful for descriptive purposes, a more practical SONET NE typically has many more switch interfaces and switch slices. Additional details of the operation and components of such a SONET NE are described in application Ser. No. 09/847,711, filed May 1, 2001, entitled "Multiservice Switching System with Distributed Switch Fabric", assigned to the same assignee as the present invention, and incorporated herein in its entirety by this reference.

Figure 4:
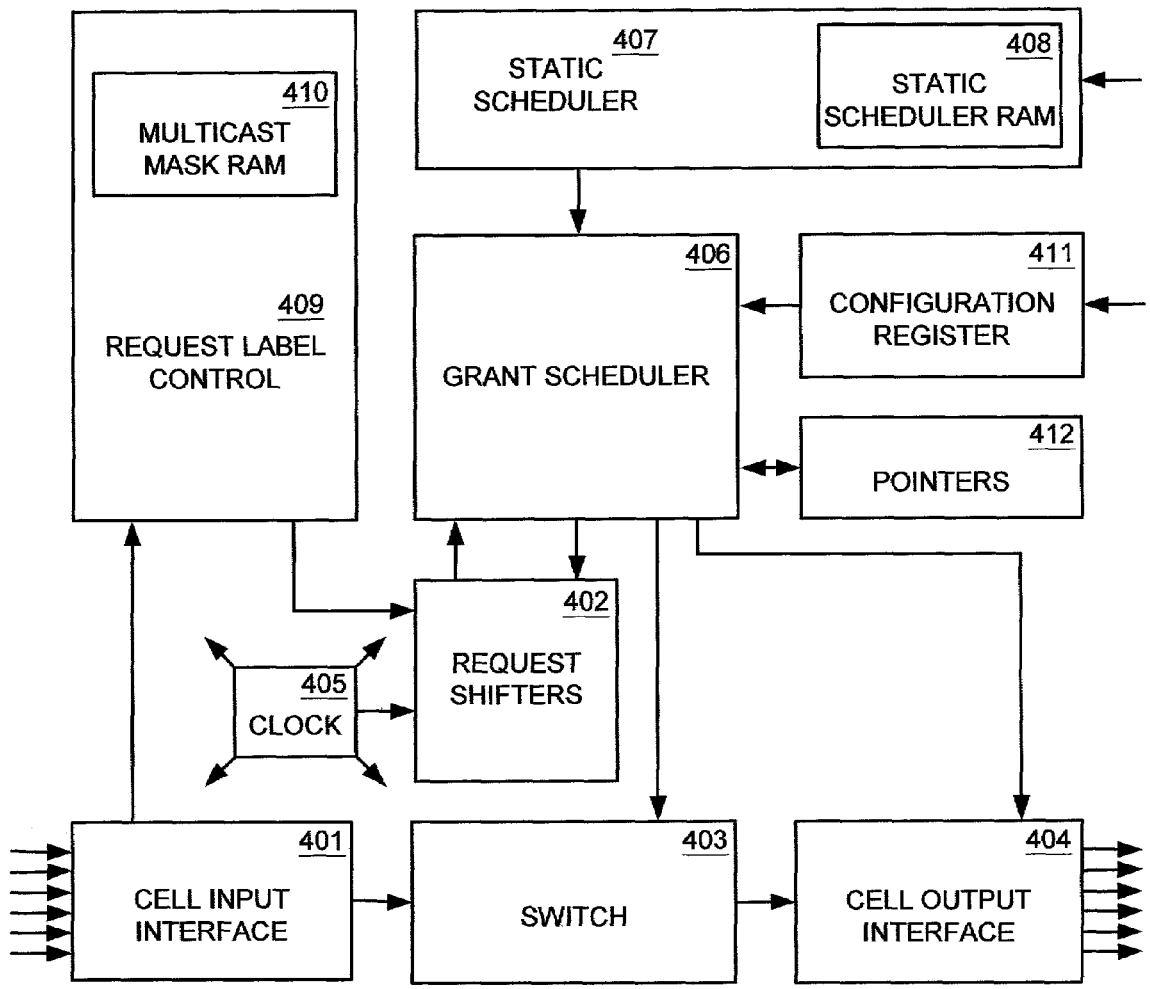
FIG. 4 illustrates, as an example, a block diagram of portions of a switch slice in the SONET network element, utilizing aspects of the present invention.

FIG. 4 illustrates a block diagram of an apparatus for scheduling static and dynamic traffic through a switch slice. Identical versions of the apparatus are included in the switch slice 107 and the switch slice 108.

A cell input interface 401 has receiving ports that receive cells from the ingress switch interfaces 101~103, and a cell output interface 404 has transmitting ports that transmit cells to the egress switch interfaces 104~106. A switch 403 is interposed between the cell input interface 401 and the cell output interface 404 to switch traffic to proper destinations.

Grant request information is retrieved from the grant/request section of received cells by the cell input interface 401. The cell input interface 401 sends the coded number stored in the request label field of each received request to a request label control 409. If the request is a multicast request, the request label control 409 decodes information in the request label field using information stored in a multicast mask random-access-memory ("RAM") 410. The number of combinations of multiple destinations in this case depends upon the size of the multicast request label 304 and depth of the multicast mask RAM 410. After determining the destinations for the dynamic traffic scheduling requests, the request information is then forwarded to request shifters 402 where they are stored.

A clock 405 generates a clock signal that defines the cell transfer clock cycle of the switch slice, as used throughout the switch slice. Upon each such clock cycle, the dynamic traffic scheduling requests remaining in the request shifters 402 are shifted up one level. Since granted requests are removed by a grant scheduler 406 from the request shifters 402, only ungranted requests remain. Thus, by inspecting the level of a dynamic traffic scheduling request, the age of that request may be determined by the number of cell transfer clock cycles that have passed without the request being granted. Upon reaching a certain age, or in this case, upon reaching the end of its respective request shifter, a request expires by being pushed out of its respective request shifter.

Figures 5, 6:
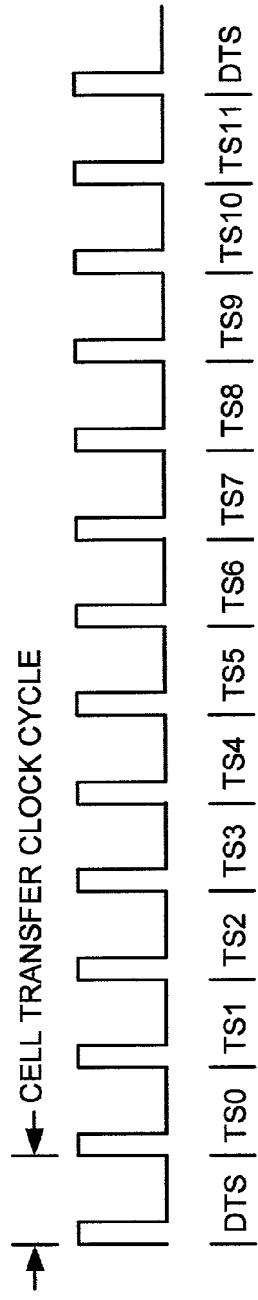
FIG. 5 illustrates, as an example, an organization of request shifters in the switch slice, utilizing aspects of the present invention.
FIG. 6 illustrates a timing example of static traffic to the switch slice, utilizing aspects of the present invention.

The request shifters 402 include one request shifter or first-in-first-out ("FIFO") buffer for each source line card. FIG. 5 illustrates an example of the organization of dynamic traffic scheduling requests 501~506 in one such request shifter. In this example, new dynamic scheduling requests enter on the bottom, and rise up one level each cell transfer clock cycle. A marker field is included next to each request so that the grant scheduler 406 can indicate winning requests that are available to be granted. Although all entries in the request shifters 402 include valid data in this example, it is to be appreciated that in practice, entries including invalid data or holes commonly occur as requests are granted or if requests are not made during certain cell transfer clock cycles.

Pointers 412 include a plurality of unicast pointers one for each destination line card's egress switch interface, and a global multicast pointer. Each of the unicast pointers indicates the last source line card's ingress switch interface that had a request granted to the pointer's associated destination line card's egress switch interface. For example, if ingress switch interface 101 had been the last source line card's ingress switch interface to be granted a dynamic traffic scheduling request to a destination line card's egress switch interface 105, then the pointer associated with egress switch interface 105 would be indicating ingress switch interface 101. The global pointer, on the other hand, indicates a source line card's ingress switch interface that is being pointed to in a predefined sequence with the pointer incremented to the next source line card's ingress switch interface in the sequence each cell transfer clock cycle in a wrap-around fashion. For example, with the three ingress switch interfaces of FIG. 1, the predefined sequence may be a repetitive sequence of ingress switch interfaces 101, 102 and 103, so that if the global pointer is indicating ingress switch interface 101, then in the next cell transfer clock cycle, it would indicate ingress switch interface 102, and so on. After pointing to ingress switch interface 103, the pointer would next wrap-around back to ingress switch interface 101.

The configuration register 411 is programmable to store a unicast/multicast indication that indicates the preference or priority unicast versus multicast requests. For example, if a binary value "00" is stored in the configuration register 411, then unicast requests would be given a higher priority than multicast requests. If a binary value "01" is stored in the configuration register 411, then multicast requests would be given a higher priority than a unicast requests. If a binary value "10" is stored in the configuration register 411, then unicast requests would be given the same priority as multicast requests. Although shown as a single register, the configuration register 411 may also comprise multiple registers to provide, for example, a weighted multicast-unicast priority. In such a multiple register configuration, for example, each register may be associated with a different time slot so that eight such registers could be programmed for eight successive time slots. As an example, by programming each of the first three registers with a binary value "00" and each of the remaining five registers with a binary value "01", then unicast requests will be given priority 3/8 of the time and multicast requests will be given priority 5/8 of the time in this case.

In this example, the configuration register 411 may be programmed either externally or internally of the switch slice such that if the switch slice has been receiving more unicast requests than multicast requests, then unicast requests are given preference over multicast requests by storing the binary value "00" in the configuration register 411. On the other hand, if the switch slice has been receiving more multicast requests than a unicast requests, then multicast requests are given preference over unicast requests by storing the binary value "01" in the configuration register 411. Finally, if the switch slice has been receiving approximately equal numbers of multicast and unicast requests, then the binary value "10" is stored in the configuration register 411. Alternatively, as another example, programming of the configuration register 411 may be based upon percentages of unicast and multicast requests that are aged out (i.e., expire) without being granted, instead of the above-described percentages of unicast and multicast requests received.

A static scheduler 407 receives information about line cards that have been configured to handle static traffic, generally, at the time that the line cards are installed in the SONET NE 100, such as at system configuration time. Alternatively, the configuration information may be received or modified at run time. In the case where the static traffic being handled is TDM traffic, static scheduling is done in sets of twelve consecutive cell transfers. In order to allow dynamic traffic to also get a chance to be sent to the same destination as the static traffic, a dynamic traffic time slot ("DTS") may be programmably reserved for a cell transfer clock cycle following one or more sets of twelve consecutive cell transfers. As an example, FIG. 6 illustrates a timing diagram for TDM traffic with a DTS inserted between each set of twelve consecutive cell transfers. Other possible arrangements include inserting a DTS after each two sets of twelve consecutive cell transfers, or after each three sets of twelve consecutive cell transfers. Each cell transfer clock cycle is referred to as a time slot, such as time slots 0~11 (TS0~TS11) in FIG. 6.

Information about the static traffic is stored by the static scheduler 407 in the form of a static switch calendar in a static scheduler RAM 408, and information about the periodicity of a DTS is programmed into the static scheduler 407 or the grant scheduler 406 through a static switching concentration code. As an example, FIG. 7 illustrates a static switch calendar 700 showing 768 entries at word addresses 0~767. In this example, 64 sources are accommodated so that the first 64 word addresses are reserved for possible TDM schedule entries from each of the 64 sources (SOURCE0~SOURCE63) for the first time slot (TS0), the next 64 word addresses are reserved for possible TDM schedule entries from each of the 64 sources for the second time slot (TS1), and so on, until the last 64 word addresses that are reserved for possible TDM schedule entries from the 64 sources for the twelfth time slot (TS11). FIG. 8 illustrates fields of representative TDM schedule entry 701 in the static switch calendar 700. In a VALID field, storing a "1" or a "0" indicates whether the entry is valid or not. Up to two destinations for the TDM cell may be specified. The first destination is specified in the DESTINATION PORT1 field, and the second destination is specified in the DESTINATION PORT2 field. If only one destination is desired, then both fields will contain that destination. A CHANNEL NUMBER field stores an associated channel number for the TDM cell. The channel number is embedded in the grant request issued to the TDM line card associated with the requesting source, so that TDM data from the appropriate channel buffer is transmitted back to the switch slice.

The grant scheduler 406, static scheduler 407, and the request label control 409 are preferably implemented by hard-wired logic circuitry to minimize their physical size and maximize their speed performance. Alternatively, other well known structures for implementing these functions may also be used such as one or more processors in conjunction with software or firmware.

Figure 9:
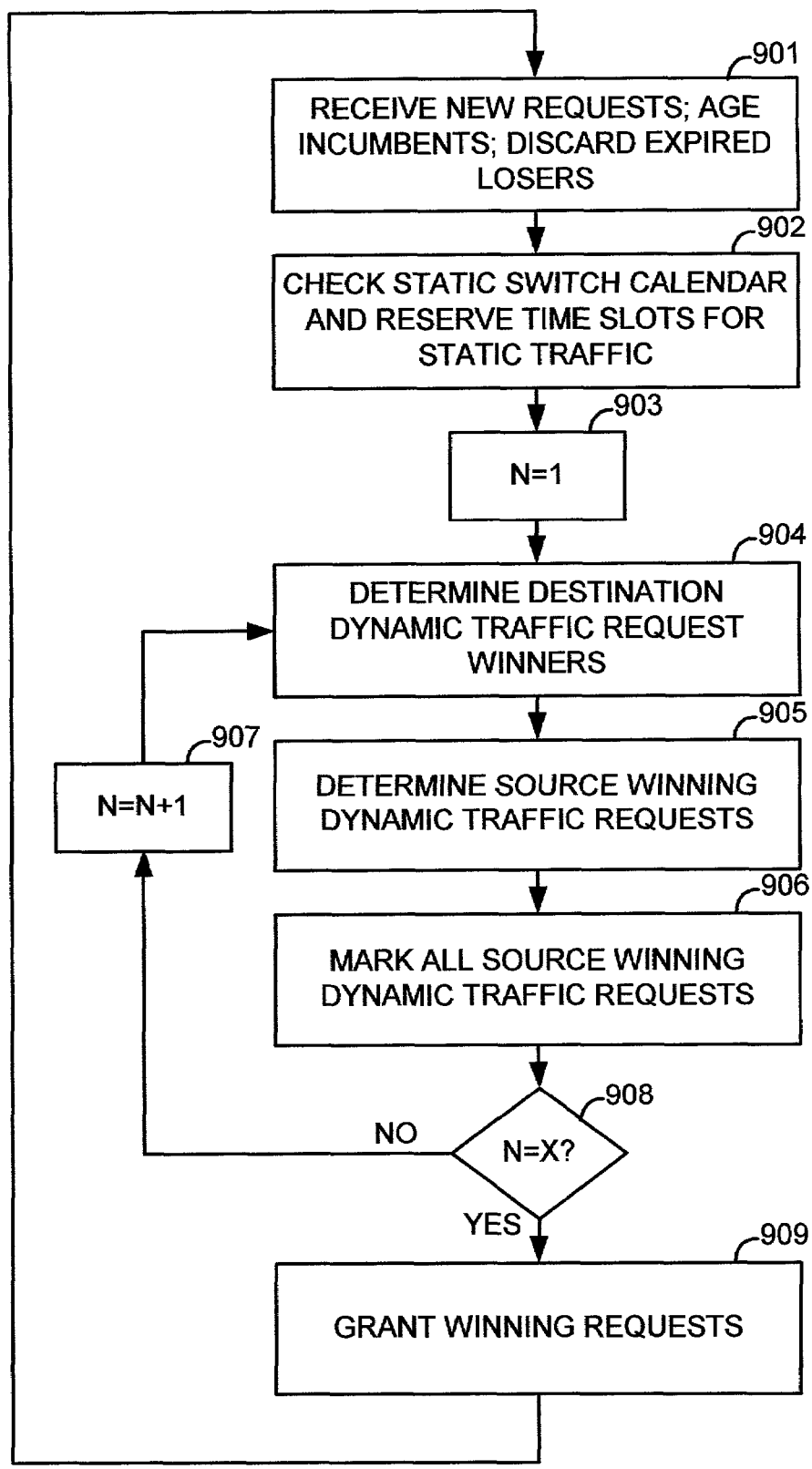
FIG. 9 illustrates, as an example, a flow diagram of a method for scheduling static and dynamic traffic through a switch slice, utilizing aspects of the present invention.

FIG. 9 illustrates a flow diagram of a method performed by apparatuses such as described in reference to FIG. 4 for scheduling static and dynamic traffic through a switch fabric. In 901, the cell input interface 401 receives dynamic traffic scheduling requests from ingress switch interfaces of the line cards. Also, the clock 405 and the request shifters 402 work together to age previously received and not granted dynamic traffic scheduling requests, and discard expired dynamic traffic scheduling requests to define active dynamic traffic scheduling requests for a switch slice in the switch fabric. In 902, the static scheduler 407 checks the static switch calendar stored in the static scheduler RAM 408 and provides the static traffic information along with the DTS information programmed into the static scheduler 407 through a static switching concentration code, to the grant scheduler 406. The grant scheduler 406 then schedules the static traffic by reserving time slots for transmitting the static traffic through the switch slice to the at least one destination specified in the corresponding TDM schedule entry. One way that it may do this is to give the static traffic a highest relative weight, so that no dynamic traffic scheduling request will ever be able to succeed in replacing it or stealing its time slot for its destination or from its source.

Figure 10:
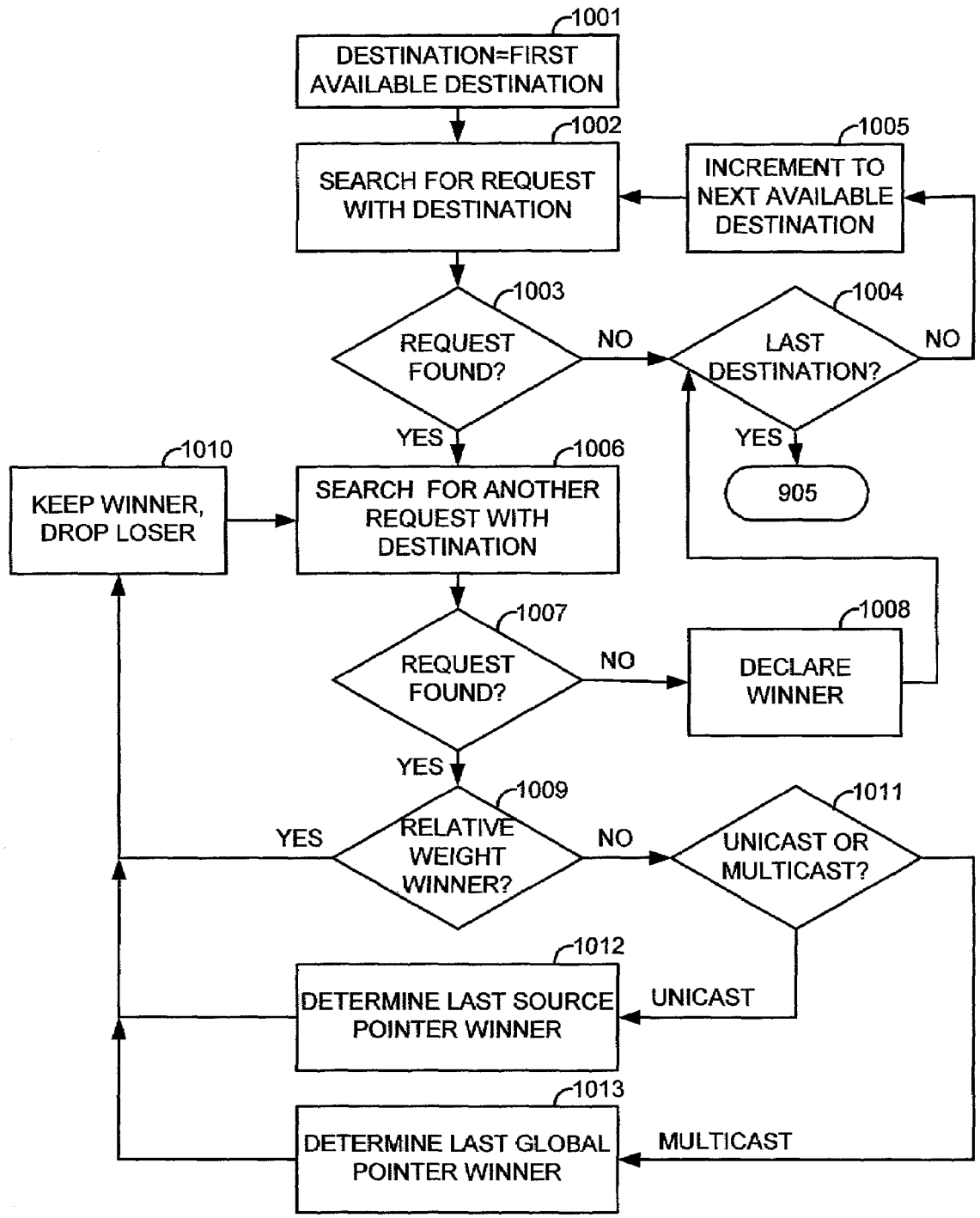
FIG. 10 illustrates, as an example, a flow diagram of a method for determining destination winning requests for dynamic traffic through a switch slice, utilizing aspects of the present invention.

In 903~908, the grant scheduler 406 then schedules the dynamic traffic so as not to be transmitting the dynamic traffic through the switch slice to the same destinations for the static traffic during the time slots reserved for the static traffic. In 903, a counter N is initialized to the integer 1. In 904, the grant scheduler 406 determines destination winning dynamic traffic scheduling requests for available destinations. The available destinations are all destinations that are not reserved for static traffic for the time slot being scheduled. Since only one cell can be transferred through a switch slice to a given destination during a cell transfer clock cycle, only one static or dynamic traffic scheduling request for that destination can be a winner for a given time slot or cell transfer clock cycle. FIG. 10 illustrates one method for performing 904.

Figure 11:
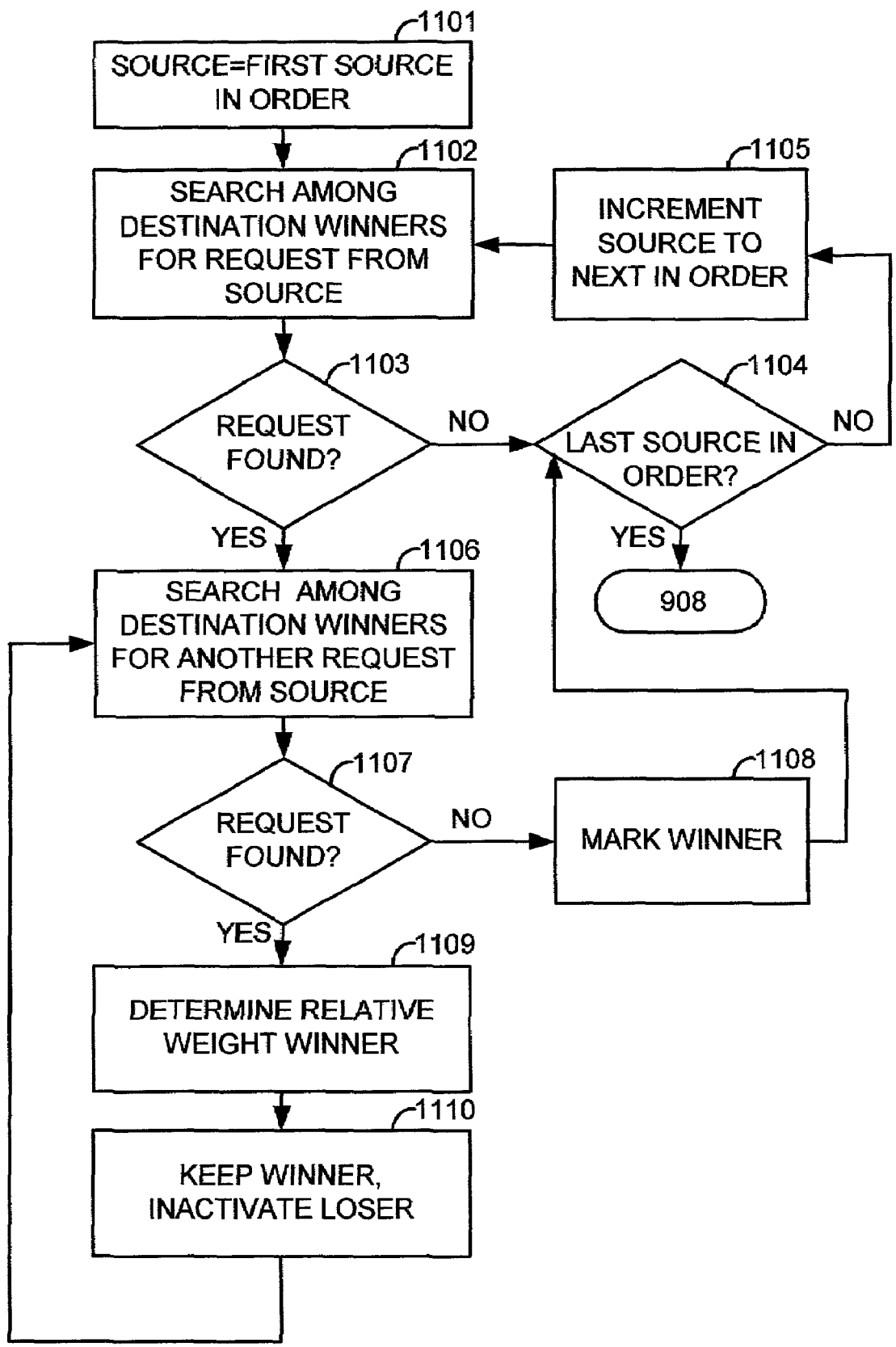
FIG. 11 illustrates, as an example, a flow diagram of a method for determining source winning requests for dynamic traffic through a switch slice, utilizing aspects of the present invention.

In 905, the grant scheduler 406 then determines source winning dynamic traffic scheduling requests from the destination winning dynamic traffic scheduling requests. Since a source can only transfer one cell to a switch slice during a cell transfer clock cycle, only one traffic scheduling request, static or dynamic, from that source can be a winner for a given time slot. Therefore, if two destination winning dynamic traffic scheduling requests come from the same source, one of those two requests will survive as a source winner and the losing one will not be considered a valid request for the time slot or cell transfer clock cycle being scheduled. FIG. 11 illustrates one method for performing 905.

In 906, the grant scheduler 406 then marks the source winning dynamic traffic scheduling requests by updating their marker fields in the request shifters 402. If any destination winning dynamic traffic scheduling requests were effectively deleted by no longer being considered a valid request for the time slot being scheduled as a result of 905, then those destinations become available, and 903~908 are repeated multiple times as specified by the integer X to schedule dynamic traffic to those available destinations. In 909, the grant scheduler 406 then grants the requests indicated by marked entries in the request shifters 402 by transmitting grants through the cell output interface 404 to the winning source line cards'egress switch interfaces in the grant/request section of cells. The source winning dynamic traffic scheduling requests are then marked invalid in their respective VALID fields such as 202, 205 or 302 in their respective entries such as 501~506 in the request shifters 402, so that they will no longer be considered in scheduling traffic for subsequent time slots.

FIG. 10 illustrates a flow diagram of a method for determining destination winning requests for dynamic traffic through a switch slice in a destination round-robin tournament fashion that is suitable for performing 904 in FIG. 9. In 1001, the destination is initialized as the first available destination in ordered sequence. In 1002, the grant scheduler 406 searches the request shifters 402 for a request having the current destination. In 1003, if a request having the current destination is not found, then the grant scheduler 406 goes to 1004 to determine whether the current destination is the last destination in ordered sequence. If it is, then the grant scheduler 406 proceeds to 905 in the method described in reference to FIG. 9. On the other hand, if it is not the last destination in ordered sequence, then the grant scheduler 406 goes to 1005 to increment the destination to the next available destination in ordered sequence, and then jumps back to 1002, to once again search for a request with the current destination.

On the other hand, if a request having the current destination was found in 1003, then in 1006, the grant scheduler 406 continues to search the request shifters 402 until it finds another active request having the current destination. In 1007, if after doing so, there is no other active dynamic traffic scheduling request having the current destination, then the originally retrieved dynamic traffic scheduling request is declared a destination winner in 1008, and the grant scheduler 406 goes back to 1004 to either proceed to 905 or 1005 as previously described.

On the other hand, if there is another active dynamic traffic scheduling request having the current destination, then in 1009~1013 the grant scheduler 406 determines the winner between the two pending dynamic traffic scheduling requests. As can be appreciated, however, the invented method is not restricted to the order that 1009~1013 is performed, nor is it restricted to having to perform all parts of 1009~1013. The key to this phase of the method is that some sort of rational and effective criteria be used to select a winner between the two pending dynamic traffic scheduling requests having the same associated destination.

In 1009, the grant scheduler 406 determines which of the two pending dynamic traffic scheduling requests has the larger relative weight. The relative weight in this case is a quantitative criterion that takes into account various important factors such as the priority of the request, whether the request is a unicast or a multicast request, the age of the request, and whether the request is a primary or a secondary request. Each of these factors can be determined as previously described from information in the request shifters 402.

The relative weight is then generated for each of the dynamic traffic scheduling requests, for example, by concatenating the priority, a unicast/multicast indication, the age, and a primary/secondary indication such that the priority is positioned in the most significant bit locations to give it the largest weight, the unicast/multicast indication is positioned in the next lower most significant bit location(s) to give it the second largest weight, the age is positioned in the next lower most significant bit locations to give it the third largest weight, and the primary/secondary indication is positioned in the least significant bit locations to give the least weight (i.e., priority>unicast/multicast>age>primary/secondary).

The unicast/multicast indication is determinable from information in the configuration register 411 and the request shifters 402. For example, if the configuration register 411 indicates that unicast requests are to be given preference over multicast requests, and the request is a unicast request, then the unicast/multicast indication is a "1". On the other hand, if the request is a multicast request, then the unicast/multicast indication is a "0". In this way, the unicast request may be given a higher weight. For the primary/secondary indication, it is assumed that the primary request is to be given preference over the secondary request, so that a primary request will result in a primary/secondary indication of "1" and a secondary request will result in a primary/secondary indication of "0".

If there is a winner in 1009, then the grant scheduler 406 performs 1010, in which it keeps the winning dynamic traffic scheduling request and drops the loser. The grant scheduler 406 then goes back to 1006 to search the request shifters 402 for another active request having the current destination.

If there is a tie in 1009, however, then the grant scheduler 406 breaks the tie by performing 1011~1013. In 1011, the grant scheduler 406 first determines whether the pending requests are both unicast or both multicast requests. Note that if one of the requests is a unicast request and the other is a multicast request, then there cannot be a tie since the unicast/multicast indication would require a winner in that case. The grant scheduler 406 determines whether a request is a unicast request or a multicast request by reading the unicast/multicast bit in their request entries. In this regard, it is noted that the unicast/multicast bit 201 in the unicast request depicted in FIG.2 is a "0", whereas the unicast/multicast bit 301 in the multicast request depicted in FIG. 3 is a "1".

If the grant scheduler 406 determines that both requests are unicast requests, then in 1012, it selects as the winner, the dynamic traffic scheduling request having an associated source that is closest in ordered wrap-around sequence after a source from which a request had most recently been granted to the same associated destination of the two vying requests. The source from which a request had most recently been granted to the same associated destination can be determined by reading the unicast pointer for that destination, which is one of the pointers 412 previously described in reference to FIG. 4.

The associated source closest after in wrap-around sequence to the source indicated in the unicast pointer is determined according to a predetermined sequence of the associated sources. Where the sources are numbered, this would simply be the next numbered source. For example, if the unicast pointer indicates a source 6, and the two vying dynamic traffic scheduling requests have associated sources 4 and 10, then the one with the associated source 10 would be declared the winner. On the other hand, if the unicast pointer indicates a source 11, and the two vying dynamic traffic scheduling requests have associated sources 4 and 10, then the one with the associated source 4 would be declared the winner, because of wrap-around.

On the other hand, if both requests are multicast requests with equal weight, then in 1013, the grant scheduler 406 selects as the winner, the dynamic traffic scheduling request having an associated source that is closest after a source indicated by a global pointer, which is one of the pointers 412 described in reference to FIG. 4.

To determine the associated source closest after the source indicated by the global pointer, the predefined sequence used to increment the pointer is used. For example, if the sources are numbered sequentially, and the predefined sequence is to increment the source indicated by the pointer in the same sequence, then if the global pointer is pointing to source 6, and the two vying requests have associated sources of 4 and 10, then the dynamic traffic scheduling request having the associated source of 10 will win in this case. On the other hand, if the global pointer is pointing to source 11, and the two vying requests have associated sources of 4 and 10, then the dynamic traffic scheduling request having the associated source of 4 will win this time, because of wrap-around.

After selecting the winner, the grant scheduler 406 then performs 1010, in which it keeps the winning dynamic traffic scheduling request and drops the loser. The grant scheduler 406 then goes back to 1006 and continues looping through 1006~1013 until a destination winner for the current destination is declared in 1008. Thereupon, the grant scheduler 406 goes to 1004 and continues looping through 1002~1013 until all available destinations that have been requested by dynamic traffic scheduling requests stored in the request shifters 402 have declared destination winners.

FIG. 11 illustrates a flow diagram of a method for determining source winning requests for dynamic traffic through a switch slice in a source round-robin tournament fashion, suitable for performing 905 and 906 in FIG. 9. In 1101, the current source is initialized as the first source in ordered sequence. In 1102, the grant scheduler 406 searches among the destination winning dynamic traffic scheduling requests until it finds one from the current source. In 1103, if a request from the current source is not found, then the grant scheduler 406 goes to 1104 to determine whether the current source is the last source in ordered sequence. If it is, then the grant scheduler 406 proceeds to 908 in the method described in reference to FIG. 9. On the other hand, if it is not the last source in ordered sequence, then the grant scheduler 406 goes to 1105 to increment the source indicator to the next source in ordered sequence, and then jump back to 1102, to once again search among the winning destination dynamic traffic scheduling requests for a request from the then current source.

On the other hand, if a request from the current source was found in 1102, then in 1106, the grant scheduler 406 continues to search among the destination winning dynamic traffic scheduling requests for another active request from the same source. In 1107, if after doing so, there is no other destination winning dynamic traffic scheduling request with the same associated source, then the originally retrieved destination winning dynamic traffic scheduling request is marked a source winner in 1108 by appropriately marking its marker field, and the grant scheduler 406 goes back to 1104 to either proceed to 908 or 1105 as previously described.

On the other hand, if there is another destination winning dynamic traffic scheduling request with the same associated source, then in 1109, the winner between the two pending dynamic traffic scheduling requests is determined by their relative weights in the manner described in reference to 1009 in FIG. 10. Note that there is no need for a tie-breaker such as performed in reference to 1010~1013 in FIG. 10, since the age and the primary/secondary indicators are guaranteed to be different in this case. In 1110, the winning dynamic traffic scheduling request is kept, and the losing request is then marked inactive by the grant scheduler 406 for the remainder of the cell transfer clock cycle being scheduled, so that it doesn't win a destination that another source could when repeating 904 in the method described in reference to FIG. 9.

The grant scheduler 406 then goes back to 1106 and continues looping through 1006~1110 until a source winner for the current source is declared and marked in 1108. Thereupon, the grant scheduler 406 goes to 1104 and continues looping through 1102~1110 until no two of the remaining destination winning dynamic traffic scheduling requests have the source.

Although the various aspects of the present invention have been described with respect to a preferred embodiment, it will be understood that the invention is entitled to full protection within the full scope of the appended claims.

We claim:

1. A method for scheduling static and dynamic traffic through a switch fabric including one or more switch slices, comprising for individual such switch slices:
   scheduling static traffic by reserving time slots for transmitting said static traffic to at least one destination through a switch slice; and
   scheduling dynamic traffic so as not to be transmitting said dynamic traffic to said at least one destination during said reserved time slots through said switch slice, wherein said scheduling dynamic traffic includes receiving dynamic traffic scheduling requests, aging previously received and not granted dynamic traffic scheduling requests, and discarding expired dynamic traffic scheduling requests to define active dynamic traffic scheduling requests.

2. The method according to claim 1, wherein said static traffic includes TDM traffic.

3. The method according to claim 1, wherein said dynamic traffic includes ATM traffic.

4. The method according to claim 1, wherein said dynamic traffic includes IP traffic.

5. The method according to claim 1, wherein said scheduling static traffic includes receiving static traffic information, and storing said static traffic information in a memory of said switch slice.

6. The method according to claim 5, wherein said static traffic information is received at a system configuration time.

7. The method according to claim 5, wherein said static traffic information is received at a run time.

8. The method according to claim 5, wherein said static traffic information includes source and destination information for said static traffic.

9. The method according to claim 8, wherein said static traffic information includes channel information for said static traffic.

10. The method according to claim 1, wherein said scheduling dynamic traffic includes giving a scheduling preference to said static traffic over said dynamic traffic.

11. The method according to claim 10, wherein said scheduling preference is implemented by giving said static traffic a higher relative weight than said dynamic traffic.

12. The method according to claim 1, wherein said scheduling dynamic traffic further includes determining a set of destination winners including a destination winning dynamic traffic scheduling request for each available destination having at least one active dynamic traffic scheduling request for that available destination.

13. The method according to claim 12, wherein said destination winning dynamic traffic scheduling request is determined by selecting a dynamic traffic scheduling request having a highest priority among the at least one active dynamic traffic scheduling request having the same destination.

14. The method according to claim 13, wherein if at least two dynamic traffic scheduling requests for the same destination are tied with the highest priority, then said winning dynamic traffic scheduling request is determined by selecting the dynamic traffic scheduling request having a highest age among said at least two dynamic traffic scheduling requests.

15. The method according to claim 12, wherein said scheduling dynamic traffic further includes determining a set of source winners from said set of destination winners by including a source winning dynamic traffic scheduling request for each source having at least one dynamic traffic scheduling request from that source.

16. The method according to claim 15, wherein said source winning dynamic traffic scheduling request is determined by selecting a dynamic traffic scheduling request having a highest priority among the at least one dynamic traffic scheduling request from the same source.

17. The method according to claim 16, wherein if at least two dynamic traffic scheduling requests from the same source are tied with the highest priority, then said source winning dynamic traffic scheduling request is determined by selecting the dynamic traffic scheduling request having a highest age among said at least two dynamic traffic scheduling requests.

18. The method according to claim 15, wherein if in the process of determining said set of source winners a destination winning dynamic traffic scheduling request is deleted from said set of destination winners, then determining a replacement for said deleted destination winning dynamic traffic scheduling request by determining a new destination winning dynamic traffic scheduling request from among the remaining dynamic traffic scheduling requests having the same destination.

19. An apparatus for scheduling static and dynamic traffic through a switch fabric including one or more switch slices, comprising for individual such switch slices:
  a plurality of buffers for storing requests for transmission of dynamic traffic to dynamic traffic destinations through a switch slice, wherein said plurality of buffers include request shifters that receive dynamic traffic scheduling requests, age previously received and not granted dynamic traffic scheduling requests by shifting them upon each clock pulse controlling transfer of cells to and from said switch slice, and discard expired dynamic traffic scheduling requests by shifting them out of said request shifters;
  a memory storing a schedule of static traffic to be transmitted to at least one static traffic destination through said switch slice; and
  a grant scheduler coupled to said plurality of buffers and said memory for reserving time slots for transmitting said static traffic to said at least one static traffic destination, and scheduling selected ones of said requests for transmission of dynamic traffic so as not to be transmitting any of said dynamic traffic to said at least one static traffic destination during said reserved time slots through said switch slice.

20. The apparatus according to claim 19, wherein said static traffic includes TDM traffic.

21. The apparatus according to claim 19, wherein said dynamic traffic includes ATM traffic.

22. The apparatus according to claim 19, wherein said dynamic traffic includes IP traffic.

23. The apparatus according to claim 19, wherein said schedule of static traffic is stored in said memory at a system configuration time.

24. The apparatus according to claim 19, wherein said schedule of static traffic is stored in said memory at a run time.

25. The apparatus according to claim 19, wherein said schedule of static traffic includes a plurality of entries individually indicating at least one destination for a given time slot and source.

26. The apparatus according to claim 25, wherein each of said plurality of entries further indicates a channel.

27. The apparatus according to claim 19, wherein said request shifters are organized into a set for each source including entries, at least one of said entries indicating a primary request and a secondary request from that source for unicast requests.

28. The apparatus according to claim 19, wherein said request shifters are organized into a set for each source including entries, at least one of said entries indicating a request from that source for a multicast request.

29. The apparatus according to claim 19, wherein said request shifters are organized into a set for each source including entries individually having a priority field for storing a priority and a destination field for storing a destination for each request in that entry.

30. The apparatus according to claim 19, wherein a position of an entry in said request shifters indicates an age of said entry.

31. The apparatus according to claim 19, wherein said request shifters are organized into a set for each source including entries individually having a marker field for indicating winning requests that are available to be granted.

32. The apparatus according to claim 19, wherein said grant scheduler comprises a grant scheduler configured to determine a set of destination winners including a destination winning dynamic traffic scheduling request for each available destination having at least one dynamic traffic scheduling requests for that available destination.

33. The apparatus according to claim 32, wherein said grant scheduler is further configured such that said destination winning dynamic traffic scheduling request is determined by selecting a dynamic traffic scheduling request having a highest priority among the at least one dynamic traffic scheduling request for the same destination.

34. The apparatus according to claim 33, wherein said grant scheduler is further configured such that if at least two dynamic traffic scheduling requests for the same destination are tied with the highest priority, then said winning dynamic traffic scheduling request is determined by selecting the dynamic traffic scheduling request having a highest age among said at least two dynamic traffic scheduling requests.

35. The apparatus according to claim 32, wherein said grant scheduler is further configured such that said scheduling dynamic traffic further includes determining a set of source winners from said set of destination winners by including a source winning dynamic traffic scheduling request for each source having at least one dynamic traffic scheduling request from that source.

36. The apparatus according to claim 35, wherein said grant scheduler is further configured such that said source winning dynamic traffic scheduling request is determined by selecting a dynamic traffic scheduling request having a highest priority among the at least one dynamic traffic scheduling request from the same source.

37. The apparatus according to claim 36, wherein said grant scheduler is further configured such that if at least two dynamic traffic scheduling requests from the same source are tied with the highest priority, then said source winning dynamic traffic scheduling request is determined by selecting the dynamic traffic scheduling request having a highest age among said at least two dynamic traffic scheduling requests.

38. The apparatus according to claim 37, wherein said grant scheduler is further configured such that if in the process of determining said set of source winners a destination winning dynamic traffic scheduling request is deleted from said set of destination winners, then determining a replacement for said deleted destination winning dynamic traffic scheduling request by determining a new destination winning dynamic traffic scheduling request from among the remaining dynamic traffic scheduling requests having the same destination.

39. A method for scheduling dynamic traffic through a switch fabric including one or more switch slices, comprising for individual such switch slices:
   (a) receiving a plurality of dynamic traffic scheduling requests individually having an associated priority, source, and destination;
   (b) incrementing ages of previously received and ungranted dynamic traffic scheduling requests individually having an associated priority, source, and destination;
   (c) generating relative weights for said plurality of dynamic traffic scheduling requests and said previously received and ungranted dynamic traffic scheduling requests based upon their associated priorities and ages; and
   (d) determining a set of dynamic traffic scheduling requests to be granted from said plurality of dynamic traffic scheduling requests and said previously received and ungranted dynamic traffic scheduling requests using said relative weights such that no two dynamic traffic scheduling requests in said set has the same associated source or destination.

40. The method according to claim 39, wherein (c) comprises concatenating said associated priority and age for each of said plurality of dynamic traffic scheduling requests and said previously received and ungranted dynamic traffic scheduling requests such that said associated priority is positioned so as to be given more weight than said associated age.

41. The method according to claim 40, wherein each of said plurality of dynamic traffic scheduling requests and said previously received and ungranted dynamic traffic scheduling requests is either a unicast or multicast request, and (c) comprises concatenating said associated priority, a unicast/multicast indication, and said associated age for each of said plurality of dynamic traffic scheduling requests and said previously received and ungranted dynamic traffic scheduling requests such that said associated priority is positioned so as to be given more weight than said unicast/multicast indication and said associated age, and said unicast/multicast indication is positioned so as to be given more weight than said associated age.

42. The method according to claim 41, wherein each of said plurality of dynamic traffic scheduling requests and said previously received and ungranted dynamic traffic scheduling requests are either primary or secondary requests, and (c) comprises concatenating said associated priority, said unicast/multicast indication, said associated age, and a primary/secondary request indication for each of said plurality of dynamic traffic scheduling requests and said previously received and ungranted dynamic traffic scheduling requests such that said associated priority, said unicast/multicast indication and said associated age are positioned so as to each be given more weight than said primary/secondary request indication.

43. The method according to claim 41, wherein if two or more dynamic traffic scheduling requests are tied with the highest relative weight compared to other dynamic traffic scheduling requests having the same associated destination, then selecting one of said two or more dynamic traffic scheduling requests to be included in said set of dynamic traffic scheduling requests to be granted, by the following tie-breaking conditions:
   if said two or more dynamic traffic scheduling requests are unicast requests, then selecting one of said two or more dynamic traffic scheduling requests that has an associated source that is closest in an ordered sequence with wraparound after a source from which a request had most recently been granted to the same associated destination; and
   if said two or more dynamic traffic scheduling requests are multicast requests, then selecting one of said two or more dynamic traffic scheduling requests that has an associated source that is closest after a source indicated by a global pointer that is advanced by one source in an ordered sequence with wrap-around upon each cell transfer clock cycle of said switch slice.

44. The method according to claim 43, wherein unicast requests are given preference over multicast requests if said switch slice has been receiving more unicast requests than multicast requests, and multicast requests are given preference over unicast requests if said switch slice has been receiving more multicast requests than unicast requests.

45. The method according to claim 44, wherein the preference of unicast or multicasts requests is toggled following each cell transfer clock cycle of said switch slice if said switch slice has been receiving approximately equal numbers of said multicast and unicast requests.

46. The method according to claim 43, wherein unicast requests are given preference over multicast requests if more unicast requests have been expiring due to age than multicast requests, and multicast requests are given preference over unicast requests if more multicast requests have been expiring due to age than unicast requests.

47. The method according to claim 39, wherein (d) comprises:
   (d1) performing a destination round-robin tournament wherein each of said plurality of dynamic traffic scheduling requests and said previously received and ungranted dynamic traffic scheduling requests is compared against each other such that if two or more of said plurality of dynamic traffic scheduling requests and said previously received and ungranted dynamic traffic scheduling requests have the same associated destination, then the one that has the highest relative weight shall be declared the winner, and if one or more of said plurality of dynamic traffic scheduling requests and said previously received and ungranted dynamic traffic scheduling requests are the only ones requesting their respective associated destinations, then said one or more of said plurality of dynamic traffic scheduling requests and said previously received and ungranted dynamic traffic scheduling requests shall each be declared a winner; and (d2) performing a source round-robin tournament wherein each winner of said destination round-robin tournament is compared against each other winner such that if two or more of said winners of said destination round-robin tournament have the same associated source, then the one that has the highest relative weight shall be declared the winner and the others shall not be considered a valid request for the remainder of the cell transfer clock cycle of said switch slice.

48. The method according to claim 47, wherein (d) further comprises:

(d3) if in the process of performing said source round-robin tournament at least one of said winners of said destination round-robin tournament shall not be considered a valid request for the remainder of the cell transfer clock cycle of said switch slice, then determining, if possible, a replacement for said at least one of said winners by repeating (d1) to (d3) until no more winners shall be eliminated as being not considered a valid request for the remainder of the cell transfer clock cycle of said switch slice.

49. An apparatus for scheduling dynamic traffic through a switch fabric including one or more switch slices, comprising for individual such switch slices:

a plurality of buffers storing requests for transmission of dynamic traffic through a switch slice, each of said requests having an associated priority, source, destination, and age; and a grant scheduler coupled to said plurality of buffers for determining a set of requests to be granted by generating relative weights for said requests based at least in part upon their associated priorities and ages, and determining a set of requests to be granted using said relative weights such that no two requests in said set has the same associated source or destination.

50. The apparatus according to claim 49, wherein said relative weight is generated by concatenating said associated priority and age for each of said requests such that said associated priority is positioned so as to be given more weight than said associated age.

51. The apparatus according to claim 50, wherein individual ones of said plurality of requests are either unicast or multicast requests, and said relative weight is generated by concatenating said associated priority, a unicast/multicast indication, and said associated age for each of said individual ones of said plurality of requests such that said associated priority is positioned so as to be given more weight than said unicast/multicast indication and said associated age, and said unicast/multicast indication is positioned so as to be given more weight than said associated age.

52. The apparatus according to claim 51, wherein individual ones of said plurality of requests are either a primary or secondary request, and said relative weight is generating by concatenating said associated priority, said unicast/multicast indication, said associated age, and a primary/secondary request indication for each of said plurality of requests such that said associated priority, said unicast/multicast and said associated age are positioned so as to each be given more weight than said primary/secondary request indication.

53. The apparatus according to claim 51, further comprising:

a plurality of pointers associated with corresponding ones of said associated destinations of said plurality of requests, and indicating sources from which requests had last been granted to said corresponding ones of said associated destinations;

wherein if two or more requests are tied with the highest relative weight compared to other requests having the same associated destination and if said two or more requests are unicast requests, then said grant scheduler determines which one of said two or more requests to be included in said set of requests to be granted by selecting the one that has an associated source that is closest in an ordered sequence with wrap-around after the source indicated by the one of said plurality of pointers associated with said same associated destination.

54. The apparatus according to claim 53, further comprising:

a global pointer indicating one of said associated sources resulting from advancing one source at a time in a predetermined repeating sequence of said associated sources upon each cell transfer clock cycle of said switch slice;

wherein if two or more requests are tied with the highest relative weight compared to other requests having the same associated destination and if said two or more requests are multicast requests, then said grant scheduler determines which one of said two or more requests to be included in said set of requests to be granted by selecting the one that has an associated source that is closest in an ordered sequence with wraparound after the source indicated by said global pointer according to said predetermined repeating sequence of said associated sources.

55. The apparatus according to claim 54, further comprising a configuration register programmable to indicate a preference between unicast and multicast requests, wherein a first value indicates that unicast requests are given preference over multicast requests, a second value indicates that multicast requests are given preference over unicast requests, and a third value indicates that unicast and multicast requests are given equal preference.

56. The apparatus according to claim 55, wherein if said switch slice has been receiving more unicast requests than multicast requests, then said configuration register is programmed to indicate said first value; if said switch slice has been receiving more multicast requests than unicast requests, then said configuration register is programmed to indicate said second value; and if said switch slice has been receiving approximately equal numbers of unicast and multicast requests, then said configuration register is programmed to indicate said third value.

57. The apparatus according to claim 55, wherein if more unicast requests have been expiring due to age than multicast requests, then said configuration register is programmed to indicate said first value; if more multicast requests have been expiring due to age than unicast requests, then said configuration register is programmed to indicate said second value; and if approximately equal numbers of unicast and multicast requests have been expiring due to age, then said configuration register is programmed to indicate said third value.

58. The apparatus according to claim 55, wherein the preference of unicast or multicasts requests is toggled following each cell transfer clock cycle of said switch slice if said configuration register indicates said third value.

59. The apparatus according to claim 54, further comprising a plurality of configuration registers respectively associated with different time slots and individually programmable to indicate a preference between unicast and multicast requests, wherein a first value indicates that unicast requests are given preference over multicast requests, a second value indicates that multicast requests are given preference over unicast requests, and a third value indicates that unicast and multicast requests are given equal preference.

60. The apparatus according to claim 49, wherein said grant scheduler determines said set of requests to be granted by:
   (d1) performing a destination round-robin tournament wherein each of said plurality of requests is compared against each other such that if two or more of said plurality of requests have the same associated destination, then the one that has the highest relative weight shall be declared the winner, and if one or more of said plurality of requests are the only ones requesting their respective associated destinations, then said one or more of said plurality of requests shall each be declared a winner; and
   (d2) performing a source round-robin tournament wherein each winner of said destination round-robin tournament is compared against each other winner such that if two or more of said winners of said destination round-robin tournament have the same associated source, then the one that has the higher relative weight shall be declared the winner and the others shall not be considered a valid request for the remainder of the cell transfer clock cycle of said switch slice.

61. The apparatus according to claim 60, wherein said grant scheduler further determines said set of requests to be granted by:
   (d3) if in the process of performing said source round-robin tournament at least one of said winners of said destination round-robin tournament shall not be considered a valid request for the remainder of the cell transfer clock cycle of said switch slice, then determining, if possible, a replacement for said at least one of said winners by repeating (d1) to (d3) until no more winners shall be eliminated as being not considered a valid request for the remainder of the cell transfer clock cycle of said switch slice.

62. A SONET/SDH network element, comprising:
a plurality of line cards individually having a plurality of switch interface transmission ports and a plurality of switch interface receiving ports; and
a plurality of switch slices individually coupled to each of said plurality of line cards, and individually including means for scheduling static traffic from one of said plurality of line cards to another or the same one of said plurality of line cards by reserving time slots for transmitting said static traffic through said individual switch slice, and means for scheduling dynamic traffic so as not to be transmitting said dynamic traffic to said another or the same one of said plurality of line cards during said reserved time slots through said individual switch slice, wherein said scheduling dynamic traffic includes receiving dynamic traffic scheduling requests, aging previously received and not granted dynamic traffic scheduling requests, and discarding expired dynamic traffic scheduling requests to define active dynamic traffic scheduling requests.

\* \* \* \* \*